US012291303B2

United States Patent
Hara et al.

(10) Patent No.: US 12,291,303 B2
(45) Date of Patent: May 6, 2025

(54) SUSPENSION CONTROL DEVICE

(71) Applicant: Shimano Inc., Osaka (JP)

(72) Inventors: Nobukatsu Hara, Osaka (JP); Toyoto Shirai, Osaka (JP); Yuta Mizutani, Osaka (JP)

(73) Assignee: Shimano Inc., Osaka (JP)

( * ) Notice: Subject to any disclaimer, the term of this patent is extended or adjusted under 35 U.S.C. 154(b) by 1147 days.

(21) Appl. No.: 17/036,527

(22) Filed: Sep. 29, 2020

(65) Prior Publication Data
US 2021/0107589 A1   Apr. 15, 2021

(30) Foreign Application Priority Data

Oct. 15, 2019 (JP) ................................. 2019-188893

(51) Int. Cl.
*B62K 25/04* (2006.01)
*B62J 45/20* (2020.01)
(Continued)

(52) U.S. Cl.
CPC ............... *B62K 25/04* (2013.01); *B62J 45/20* (2020.02); *B62J 45/412* (2020.02);
(Continued)

(58) Field of Classification Search
CPC .............. B62K 25/04; B62K 2025/044; B62K 2025/045; B62K 25/28; B62J 45/20;
(Continued)

(56) References Cited

U.S. PATENT DOCUMENTS

| 8,251,376 B2 | 8/2012 | Mouri et al. |
| 9,156,325 B2 | 10/2015 | Galasso et al. |

(Continued)

FOREIGN PATENT DOCUMENTS

| CN | 103635696 A | | 3/2014 | |
| GB | 2546186 A | * | 7/2017 | ............. B62K 25/04 |

(Continued)

OTHER PUBLICATIONS

Evo, Mountain Bike Suspension: How Does It Work?, https://web.archive.org/web/20171001000000*/https://www.evo.com/guides/how-mountain-bike-suspension-works (Year: 2017).*

*Primary Examiner* — James J Lee
*Assistant Examiner* — Andrew Sang Kim
(74) *Attorney, Agent, or Firm* — Global IP Counselors, LLP

(57) ABSTRACT

A control device is provided for controlling an adjusting device of a human-powered vehicle. The adjusting device adjusts a front initial sag amount of a front suspension of the human-powered vehicle in a state in where a rider is riding the human-powered vehicle and a rear initial sag amount of a rear suspension of the human-powered vehicle in a state where the rider is riding the human-powered vehicle. The control device comprises an electronic controller configured to output a front control signal that adjusts the front initial sag amount of the front suspension of the human-powered vehicle, and output a rear control signal that adjusts the rear initial sag amount of the rear suspension of the human-powered vehicle to the adjusting device based on traveling information related to traveling of the human-powered vehicle.

21 Claims, 5 Drawing Sheets

(51) Int. Cl.
*B62J 45/412* (2020.01)
*B62J 45/415* (2020.01)

(52) U.S. Cl.
CPC ..... *B62J 45/4152* (2020.02); *B62K 2025/044* (2013.01); *B62K 2025/045* (2013.01)

(58) Field of Classification Search
CPC .... B62J 45/412; B62J 45/4152; B62J 45/414; B62J 43/28; B62M 6/55
See application file for complete search history.

(56) References Cited

U.S. PATENT DOCUMENTS

| | | | |
|---|---|---|---|
| 2003/0020255 A1* | 1/2003 | Felsl | B62K 19/36 |
| | | | 280/283 |
| 2008/0296814 A1 | 12/2008 | Franklin et al. | |
| 2010/0327542 A1* | 12/2010 | Hara | B62K 25/286 |
| | | | 280/5.503 |
| 2014/0088828 A1 | 3/2014 | Wesling et al. | |
| 2017/0008584 A1* | 1/2017 | Butora | B62J 50/22 |
| 2018/0037294 A1* | 2/2018 | Kurotobi | B62K 25/04 |
| 2018/0265059 A1* | 9/2018 | D' Addetta | B60W 30/18145 |
| 2018/0362003 A1* | 12/2018 | Ono | B62L 3/04 |

FOREIGN PATENT DOCUMENTS

| | | |
|---|---|---|
| JP | 56-39877 U | 4/1981 |
| JP | 57-151188 U | 9/1982 |
| JP | 62-169259 U | 10/1987 |
| JP | 1-73481 U | 5/1989 |

\* cited by examiner

SUSPENSION CONTROL DEVICE

CROSS-REFERENCE TO RELATED APPLICATIONS

This application claims priority to Japanese Patent Application No. 2019-188893, filed on Oct. 15, 2020. The entire disclosure of Japanese Patent Application No. 2019-188893 is hereby incorporated herein by reference.

BACKGROUND

Technical Field

The present invention generally relates to a control device.

Background Information

A known control device controls a component of a human-powered vehicle. U.S. Pat. No. 8,251,376 (Patent Document 1) discloses the configuration of a control device that controls a suspension of a human-powered vehicle.

SUMMARY

One object of the present disclosure is to provide a control device for a human-powered vehicle that improves usability.

A control device in accordance with a first aspect of the present disclosure is for a human-powered vehicle. The control device controls an adjusting device that adjusts a front initial sag amount of a front suspension of the human-powered vehicle in a state where a rider is riding the human-powered vehicle, and that adjusts a rear initial sag amount of a rear suspension of the human-powered vehicle in a state where the rider is riding the human-powered vehicle. The control device comprises an electronic controller configured to output a front control signal that adjusts the front initial sag amount of the front suspension of the human-powered vehicle, and output a rear control signal that adjusts the rear initial sag amount of the rear suspension of the human-powered vehicle to the adjusting device based on traveling information related to traveling of the human-powered vehicle.

The control device according to the first aspect outputs the front control signal and the rear control signal based on the traveling information related to traveling of the human-powered vehicle. Thus, usability of the human-powered vehicle is improved.

In accordance with a second aspect of the present disclosure, the control device according to the first aspect is configured so that the first front overall length control signal includes a first front overall length control signal that sets an overall length of the front suspension to a first front length and a second front overall length control signal that sets the overall length of the front suspension to a second front length that is greater than the first front length. Further, the rear control signal includes a first rear overall length control signal that sets an overall length of the rear suspension to a first rear length and a second rear overall length control signal that sets the overall length of the rear suspension to a second rear length that is greater than the first rear length.

The control device according to the second aspect outputs the control signals for adjusting the overall lengths of the front suspension and the rear suspension in a preferred manner in a case where the human-powered vehicle is traveling. Thus, usability of the human-powered vehicle is improved.

In accordance with a third aspect of the present disclosure, the control device according to the second aspect is configured so that the electronic controller is configured to output both of the first front overall length control signal and the second rear overall length control signal to the adjusting device upon the electronic controller determining that the human-powered vehicle is traveling uphill based on the traveling information.

The control device according to the third aspect outputs the control signals in a case where the human-powered vehicle is traveling uphill so that the overall lengths of the front suspension and the rear suspension become suitable for traveling uphill. Thus, usability of the human-powered vehicle is improved.

In accordance with a fourth aspect of the present disclosure, the control device according to the second or third aspect is configured so that the electronic controller is configured to output the second front overall length control signal to the adjusting device upon the electronic controller determining that the human-powered vehicle is traveling downhill based on the traveling information.

The control device according to the fourth aspect outputs the control signal in a case where the human-powered vehicle is traveling downhill so that the overall length of the front suspension becomes suitable for traveling downhill. Thus, usability of the human-powered vehicle is improved.

In accordance with a fifth aspect of the present disclosure, the control device according to any one of the first to fourth aspects is configured so that the front suspension includes a front chamber containing fluid to receive load produced by the rider and that the rear suspension includes a rear chamber containing fluid to receive load produced by the rider. The front control signal includes a first front volume control signal that sets a volume of the front chamber to a first front volume and a second front volume control signal that sets the volume of the front chamber to a second front volume that is greater than the first front volume. Further, the rear control signal includes a first rear volume control signal that sets a volume of the rear chamber to a first rear volume and a second rear volume control signal that sets the volume of the rear chamber to a second rear volume that is greater than the first rear volume.

The control device according to the fifth aspect outputs the control signals for adjusting the volumes of the front suspension and the rear suspension in a preferred manner in a case where the human-powered vehicle is traveling. Thus, usability of the human-powered vehicle is improved.

In accordance with a sixth aspect of the present disclosure, the control device according to the fifth aspect is configured so that the electronic controller is configured to output both of the first front volume control signal and the second rear volume control signal to the adjusting device upon the electronic controller determining that the human-powered vehicle is traveling uphill based on the traveling information.

The control device according to the sixth aspect outputs the control signals in a case where the human-powered vehicle is traveling uphill so that the volumes of the front chamber and the rear chamber become suitable for traveling uphill. Thus, usability of the human-powered vehicle is improved.

In accordance with a seventh aspect of the present disclosure, the control device according to the fifth or sixth aspect is configured so that the electronic controller is configured to output the second front volume control signal upon the electronic controller determining that the human-powered vehicle is traveling downhill.

The control device according to the seventh aspect outputs the control signal in a case where the human-powered vehicle is traveling downhill so that the volume of the front chamber becomes suitable for traveling downhill. Thus, usability of the human-powered vehicle is improved.

A control device in accordance with an eighth aspect is for a human-powered vehicle. The control device controls an adjusting device that adjusts a rear initial sag amount of a rear suspension of the human-powered vehicle in a state where a rider is riding the human-powered vehicle. The control device comprises an electronic controller configured to output a rear control signal that adjusts the rear initial sag amount of the rear suspension of the human-powered vehicle based on traveling information related to traveling of the human-powered vehicle.

The control device according to the eighth aspect outputs the rear control signal based on the traveling information related to traveling of the human-powered vehicle. Thus, usability of the human-powered vehicle is improved.

In accordance with a ninth aspect of the present disclosure, the control device according to the eighth aspect is configured so that the rear control signal includes a first rear overall length control signal that sets an overall length of the rear suspension to a first rear length and a second rear overall length control signal that sets the overall length of the rear suspension to a second rear length that is greater than the first rear length.

The control device according to the ninth aspect outputs the control signal for adjusting the overall length of the rear suspension in a preferred manner in a case where the human-powered vehicle is traveling. Thus, usability of the human-powered vehicle is improved.

In accordance with a tenth aspect of the present disclosure, the control device according to the ninth aspect is configured so that the electronic controller is configured to output the second rear overall length control signal to the adjusting device upon the electronic controller determining that the human-powered vehicle is traveling uphill based on the traveling information.

The control device according to the tenth aspect outputs the control signal in a case where the human-powered vehicle is traveling uphill so that the overall length of the rear suspension becomes suitable for traveling uphill. Thus, usability of the human-powered vehicle is improved.

In accordance with an eleventh aspect of the present disclosure, the control device according to any one of the eighth to tenth aspects is configured so that the rear suspension includes a rear chamber containing fluid to receive load produced by the rider. Further, the rear control signal includes a first rear volume control signal that sets a volume of the rear chamber to a first volume and a second rear volume control signal that sets the volume of the rear chamber to a second volume that is greater than the first volume.

The control device according to the eleventh aspect outputs the control signal for adjusting the volume of the rear chamber in a preferred manner in a case where the human-powered vehicle is traveling. Thus, usability of the human-powered vehicle is improved.

In accordance with a twelfth aspect of the present disclosure, the control device according to the eleventh aspect is configured so the electronic controller is configured to output the second rear volume control signal to the adjusting device upon the electronic controller determining that the human-powered vehicle is traveling uphill based on the traveling information.

The control device according to the twelfth aspect outputs the control signal upon the human-powered vehicle is traveling uphill so that the volume of the rear chamber becomes suitable for traveling uphill. Thus, usability of the human-powered vehicle is improved.

In accordance with a thirteenth aspect of the present disclosure, the control device according to any one of the first to twelfth aspects is configured so that the traveling information includes an angle of the human-powered vehicle with respect to a pitch direction and at least one of a load on a front wheel support axle, a load on a rear wheel support axle, an input depression force, a traveling speed, and a seated state of the rider.

The control device according to the thirteenth aspect outputs the control signal for adjusting the front suspension and/or the rear suspension of the human-powered vehicle in accordance with appropriate traveling information. Thus, usability of the human-powered vehicle is improved.

A control device in accordance with a fourteenth aspect is for a human-powered vehicle. The control device controls an adjusting device that adjusts a front initial sag amount of a front suspension of the human-powered vehicle in a state where a rider is riding the human-powered vehicle. The control device comprises an electronic controller configured to output a front control signal that adjusts a height of the front suspension of the human-powered vehicle based on traveling information related to traveling of the human-powered vehicle excluding information related to a seated state of the rider and information related to a seat height.

The control device according to the fourteenth aspect outputs the front control signal based on the traveling information related to traveling of the human-powered vehicle. Thus, usability of the human-powered vehicle is improved.

In accordance with a fifteenth aspect of the present disclosure, the control device according to the fourteenth aspect is configured so that the front control signal includes a first front overall length control signal that sets an overall length of the front suspension to a first front length and a second front overall length control signal that sets the overall length of the front suspension to a second front length that is greater than the first front length.

The control device according to the fifteenth aspect outputs the control signal for adjusting the overall length of the front suspension in a preferred manner in a case where the human-powered vehicle is traveling. Thus, usability of the human-powered vehicle is improved.

In accordance with a sixteenth aspect of the present disclosure, the control device according to the fifteenth aspect is configured so that the electronic controller is configured to output the first front overall length control signal to the adjusting device upon the electronic controller determining that the human-powered vehicle is traveling uphill based on the traveling information.

The control device according to the sixteenth aspect outputs the control signal in a case where the human-powered vehicle is traveling uphill so that the overall length of the front suspension becomes suitable for traveling uphill. Thus, usability of the human-powered vehicle is improved.

In accordance with a seventeenth aspect of the present disclosure, the control device according to the fifteenth or sixteenth aspect is configured so that the electronic controller is configured to output the second front overall length control signal to the adjusting device upon the electronic controller determining that the human-powered vehicle is traveling downhill based on the traveling information.

The control device according to the seventeenth aspect outputs the control signal in a case where the human-powered vehicle is traveling downhill so that the overall length of the rear suspension becomes suitable for traveling downhill. Thus, usability of the human-powered vehicle is improved.

In accordance with an eighteenth aspect of the present disclosure, the control device according to any one of the fourteenth to seventeenth aspects is configured so that the front suspension includes a front chamber containing fluid to receive load produced by the rider. The front control signal includes a first front volume control signal that sets a volume of the front chamber to a first volume and a second front volume control signal that sets the volume of the front chamber to a second volume that is greater than the first volume.

The control device according to the eighteenth aspect outputs the control signal for adjusting the volume of the front chamber in a preferred manner in a case where the human-powered vehicle is traveling. Thus, usability of the human-powered vehicle is improved.

In accordance with a nineteenth aspect of the present disclosure, the control device according to the eighteenth aspect is configured so that the electronic controller is configured to output the first front volume control signal to the adjusting device upon the electronic controller determining that the human-powered vehicle is traveling uphill based on the traveling information.

The control device according to the nineteenth aspect outputs the control signal in a case where the human-powered vehicle is traveling uphill so that the volume of the front chamber becomes suitable for traveling uphill. Thus, usability of the human-powered vehicle is improved.

In accordance with a twentieth aspect of the present disclosure, the control device according to the eighteenth or nineteenth aspect is configured so that the electronic controller is configured to output the second front volume control signal to the adjusting device upon the electronic controller determining that the human-powered vehicle is traveling downhill based on the traveling information.

The control device according to the twentieth aspect outputs the control signal in a case where the human-powered vehicle is traveling downhill so that the volume of the front chamber becomes suitable for traveling downhill. Thus, usability of the human-powered vehicle is improved.

In accordance with a twenty-first aspect of the present disclosure, the control device according to any one of the fourteenth to twentieth aspects is configured so that the traveling information includes an angle of the human-powered vehicle with respect to a pitch direction and at least one of a load on a front wheel support axle, a load on a rear wheel support axle, an input depression force, and a traveling speed.

The control device according to the twenty-first aspect outputs the control signal for adjusting the front suspension of the human-powered vehicle in accordance with appropriate traveling information. Thus, usability of the human-powered vehicle is improved.

The control device in accordance with the present disclosure improves usability of a human-powered vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle field from this disclosure that the following descriptions of the embodiments are provided for illustration only and not for the purpose of limiting the invention as defined by the appended claims and their equivalents.

First Embodiment

Figure 1:
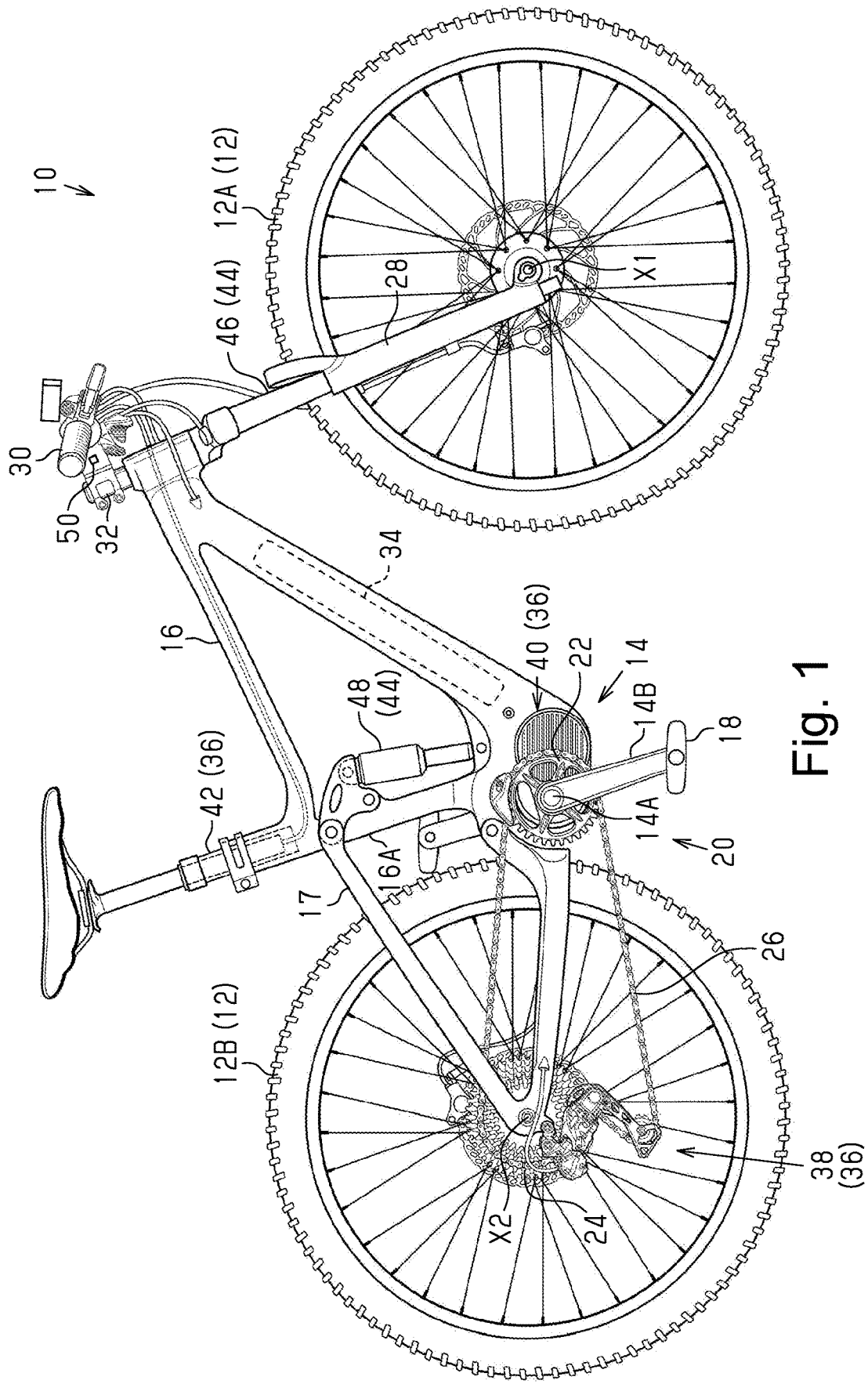
FIG. 1 is a side elevational view of a human-powered vehicle including a control device in accordance with a first embodiment.
Figure 2:
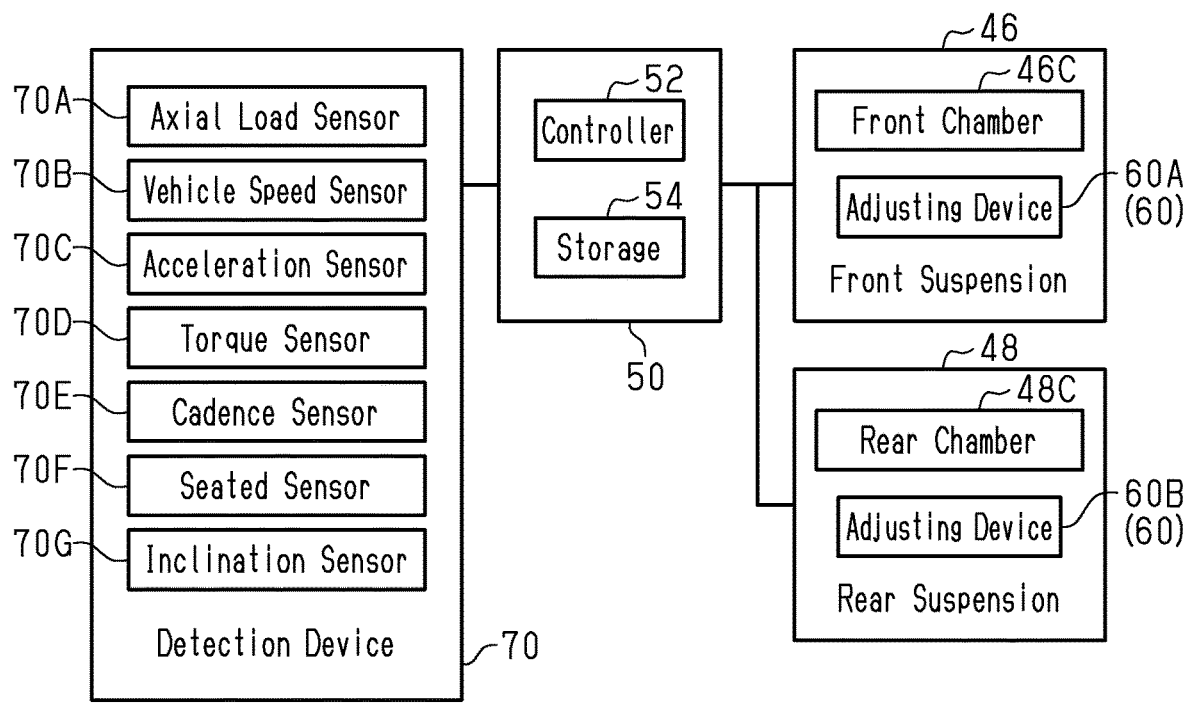
FIG. 2 is a block diagram showing the configuration of the control device shown in FIG. 1.
Figure 3:
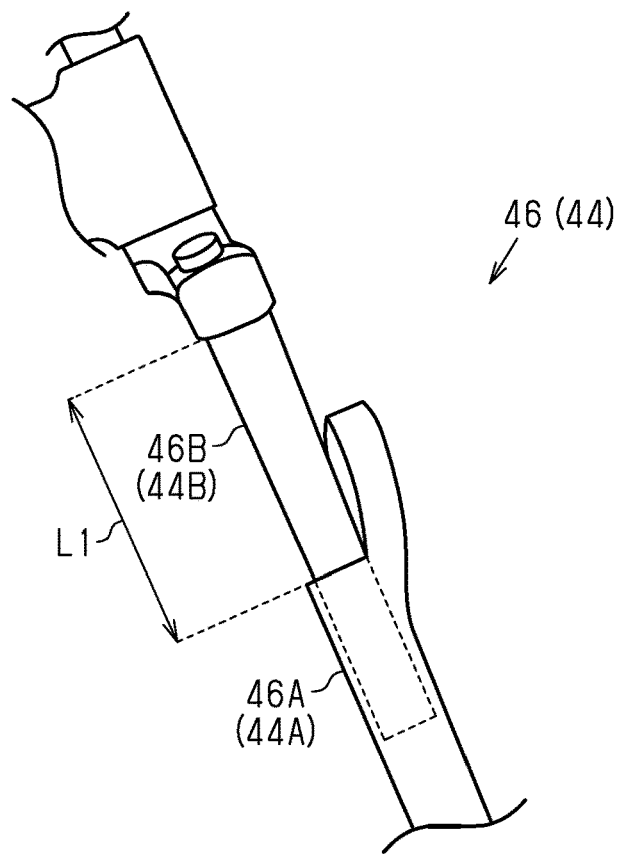
FIG. 3 is an enlarged view of part of a front suspension shown in FIG. 1.
Figure 4:
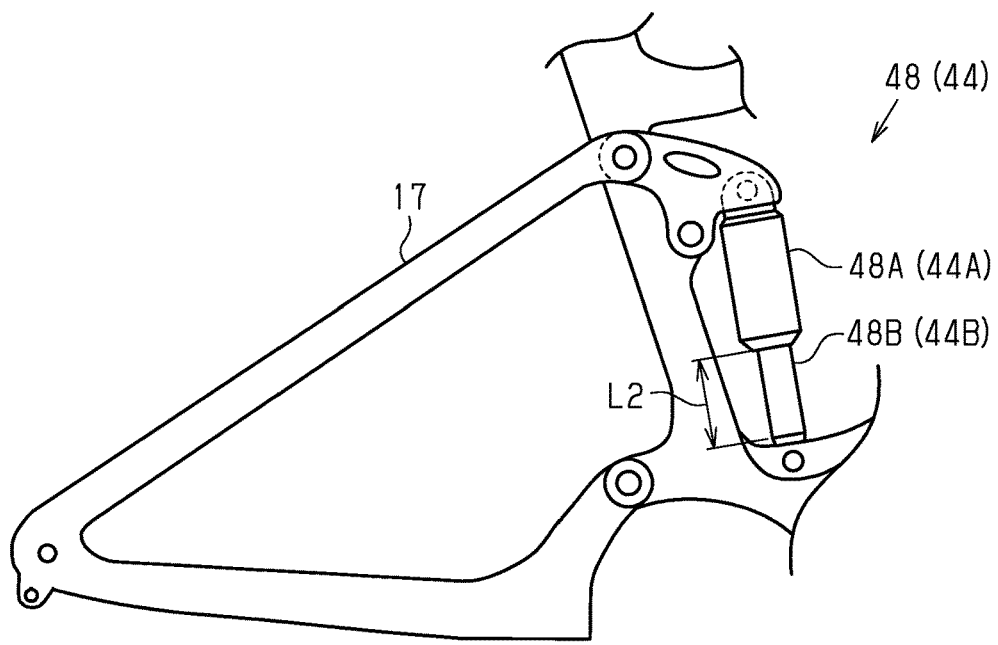
FIG. 4 is an enlarged view of part of a rear suspension shown in FIG. 1.
Figure 5:
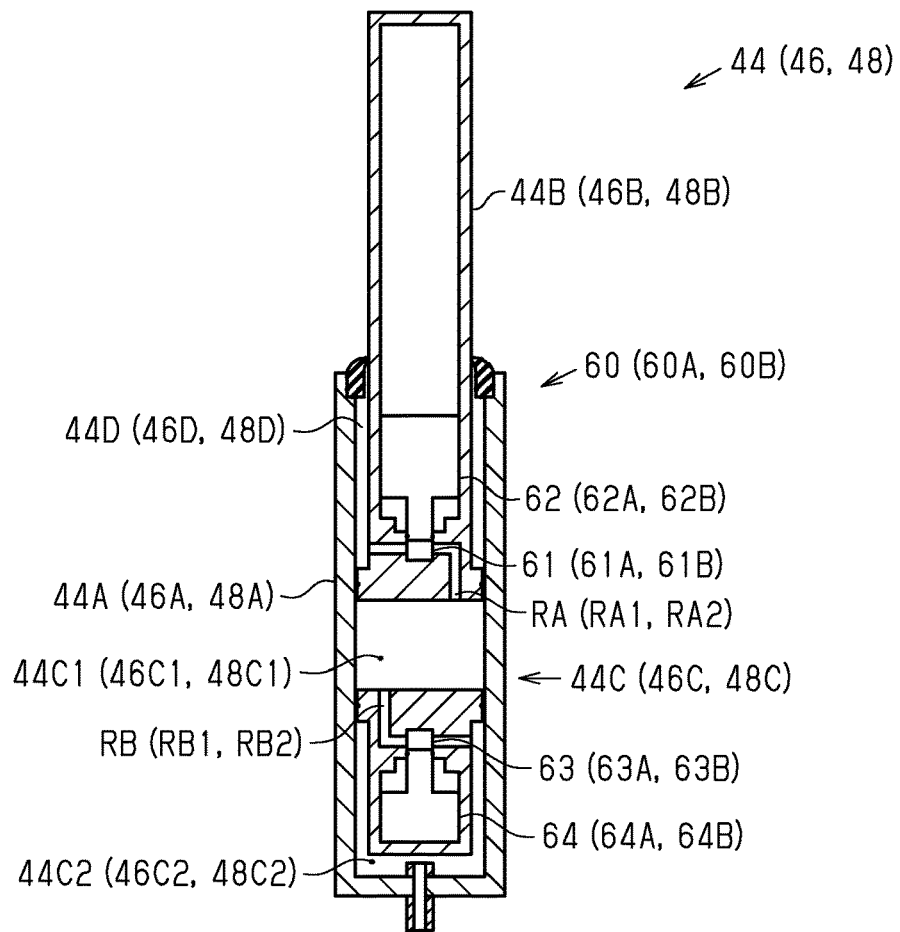
FIG. 5 is a cross-sectional view showing the structure of part of a suspension.

A human-powered vehicle 10 that includes a human-powered vehicle control device 50 will now be described with reference to FIGS. 1 to 5. Hereinafter, the human-powered vehicle control device 50 will be simply referred to as the control device 50. However, the control device 50 can also be referred to as a suspension control device, a human-powered vehicle suspension control device, or a bicycle suspension control device. The human-powered vehicle 10 shown in FIG. 1 is a vehicle that can be driven by at least human driving force. Examples of the human-powered vehicle 10 include various types of bicycles such as a mountain bike, a road bike, a city bike, a cargo bike, and a recumbent bicycle, as well as an electric bicycle (E-bike). There is no limit to the number of wheels of the human-powered vehicle 10. For example, the human-powered vehicle 10 can be a unicycle or a vehicle having three or more wheels. An electric bicycle includes an electric assist bicycle that assists propulsion of the vehicle with an electric motor. In the embodiments described hereafter, the human-powered vehicle 10 will be referred to as a bicycle.

The human-powered vehicle 10 includes wheels 12. The wheels 12 include a front wheel 12A and a rear wheel 12B. The human-powered vehicle 10 further includes a crank assembly 14. The human-powered vehicle 10 further includes a frame 16 and a swingarm 17 that is movable relative to the frame 16. The human driving force is input to the crank assembly 14. The crank assembly 14 includes a crank axle 14A and two crank arms 14B. The crank axle 14A is rotatably supported by the frame 16. The two crank arms 14B are provided on two axial ends of the crank axle 14A, respectively. Two pedals 18 are respectively connected to the two crank arms 14B. In the present embodiment, the rear wheel 12B is the drive wheel. The rear wheel 12B is driven by the rotation of the crank assembly 14. The drive wheel is supported by the swingarm 17. The crank assembly 14 is connected to the rear wheel 12B by a drive mechanism 20. The drive mechanism 20 includes a first rotational body 22 coupled to the crank axle 14A. The crank axle 14A can be coupled to the first rotational body 22 by a first one-way clutch. The one-way clutch is configured to rotate the first rotational body 22 forward in a case where the crank assembly 14 is rotated forward and configured to allow relative rotation of the crank assembly 14 and the first rotational body 22 in a case where the crank assembly 14 is rotated rearward. The first rotational body 22 includes a sprocket, a pulley, or a bevel gear. The drive mechanism 20 further includes a second rotational body 24 and a linking member 26. The linking member 26 is configured to transmit rotational force of the first rotational body 22 to the second rotational body 24. The linking member 26 includes, for example, a chain, a belt, or a shaft.

The second rotational body 24 is connected to the drive wheel. The second rotational body 24 includes a sprocket, a pulley, or a bevel gear. Preferably, a second one-way clutch is provided between the second rotational body 24 and the drive wheel. The second one-way clutch is configured to rotate the drive wheel forward in a case where the second rotational body 24 is rotated forward and configured to allow relative rotation of the second rotational body 24 and the drive wheel in a case where the second rotational body 24 is rotated rearward.

A front fork 28 is rotatably attached to the frame 16. The front wheel 12A is supported by the front fork 28. A handlebar 30 is connected to the front fork 28 by a stem 32. The front wheel 12A can be the drive wheel. Alternatively, the front wheel 12A and the rear wheel 12B can both be the drive wheels.

The human-powered vehicle 10 includes an electric power supply 34. The electric power supply 34 includes one or more battery cells. The electric power supply 34 is configured to supply electric power to the control device 50 and a component 36 (also referred to as a human-powered vehicle component or a bicycle component). Preferably, the electric power supply 34 is connected to the control device 50 through wired or wireless connection in a manner allowing for communication. One example of wired communication is power line communication (PLC).

The human-powered vehicle 10 further includes the component 36. The component 36 includes at least one of a transmission 38, a drive unit 40 including a motor configured to apply a propulsion force to the human-powered vehicle 10, an adjustable seatpost 42, and a suspension 44. In the present embodiment, the component 36 includes the transmission 38, the drive unit 40, the adjustable seatpost 42, and the suspension 44.

The transmission 38 is configured to change a transmission ratio of a rotational speed of the drive wheel (e.g., the rear wheel 12B) to a rotational speed of the crank axle 14A. Preferably, the transmission 38 is configured to change the transmission ratio in a stepped manner. The transmission 38 includes, for example, at least one of an internal hub transmission device and an external transmission device. The transmission 38 can be provided on, for example, a housing of the drive unit 40.

The drive unit 40 includes an actuator. The actuator includes an electric motor. The electric motor includes, for example, a brushless motor. The actuator is provided to transmit rotation to a non-drive wheel, that is, the front wheel 12A, or to a power transmission path of the human driving force extending from the pedals 18 to the drive wheel, that is, the rear wheel 12B. In the present embodiment, the actuator is provided to transmit rotation to the first rotational body 22.

The actuator can be provided on a hub of the rear wheel 12B. In this case, the actuator directly transmits rotation to the rear wheel 12B without using the linking member 26. The actuator can be provided on a hub of the front wheel 12A. In this case, the actuator directly transmits rotation to the front wheel 12A. The actuator can be configured in any manner as long as the actuator is configured to drive at least one of the rear wheel 12B and the front wheel 12A directly or indirectly. The drive unit 40 further includes a speed reducer in its housing. The actuator transmits rotation via the speed reducer to at least one of the front wheel 12A and the power transmission path of the human driving force between the pedals 18 and the rear wheel 12B.

The adjustable seatpost 42 is provided on a seat tube 16A and is configured to change the height of the seat. The adjustable seatpost 42 includes an electric seatpost and a mechanical seatpost. An electric seatpost is configured to be extended and retracted by an electric actuator. A mechanical seatpost is configured to be extended by force of at least one of a spring and air in a case where a valve is controlled by an electric actuator, and the seatpost is configured to be retracted in a case where human force is added. A mechanical seatpost includes a hydraulic seatpost or a hydraulic/pneumatic seatpost.

The suspension 44 includes at least one of a front suspension 46 and a rear suspension 48. The suspension 44 includes a spring structure that absorbs shock added to the wheels and a damper structure that reduces vibration of the spring structure. A known damper structure can be applied to the suspension 44 and thus the damper structure will not be described in detail. The spring structure of the suspension 44 will now be described. The suspension 44 shown in FIGS. 3 to 5 includes a first member 44A and a second member 44B. The second member 44B is fitted into the first member 44A and is movable relative to the first member 44A.

The front suspension 46 is configured to be provided between the frame 16 and the front wheel 12A of the human-powered vehicle 10. More specifically, the front suspension 46 is provided on the front fork 28. The front suspension 46 includes a front chamber 46C containing fluid to receive load produced by a rider. The front suspension 46 absorbs shock added to the front wheel 12A. In the present embodiment, the fluid is air.

The rear suspension 48 is configured to be provided between the frame 16 and the rear wheel 12B. More specifically, the rear suspension 48 is provided between the frame 16 and the swingarm 17. The rear suspension 48 includes a rear chamber 48C containing fluid to receive load produced by a rider. The rear suspension 48 absorbs shock added to the rear wheel 12B. In the present embodiment, the fluid is air.

In the present embodiment, the control device 50 controls an adjusting device 60 that adjusts a front initial sag amount of the front suspension 46 of the human-powered vehicle 10 in a state where a rider is riding the human-powered vehicle 10 and a rear initial sag amount of the rear suspension 48 in a state where the rider is riding the human-powered vehicle 10. The adjusting device 60 can also be considered a suspension sag adjuster. The control device 50 controls the adjusting device 60 through wireless or wired communication. The control device 50 includes an electronic controller 52 and a storage 54. The controller 52 includes one or more processors that execute predetermined control programs.

Hereinafter, the electronic controller 52 will be simply referred to as the controller 52. The term "electronic controller" as used herein refers to hardware that executes a software program, and does not include a human. Each processor preferably includes, for example, a central processing unit (CPU) or a micro-processing unit (MPU). When the controller 52 has more than one processors, the processors can be located at the same location (e.g., a single printed circuit board) or at one or more separate locations. Thus, the controller 52 can include one or more microcomputers. The storage 54 stores information used for various types of control programs and control processes. The storage 54 can be any a non-transitory computer readable medium or computer storage. The storage 54 includes, for example, a nonvolatile memory and a volatile memory. A nonvolatile memory includes, for example, at least one of a read-only memory (ROM), an erasable programmable read-only memory (EPROM), an electrically erasable programmable read-only memory (EEPROM), and a flash memory. A volatile memory includes, for example, a random access memory (RAM).

In the present embodiment, the adjusting device 60 includes a front adjusting device 60A that adjusts the front initial sag amount of the front suspension 46 of the human-powered vehicle 10 in a state where a rider is riding the human-powered vehicle 10 and a rear adjusting device 60B that adjusts the rear initial sag amount of the rear suspension 48 of the human-powered vehicle 10 in a state where the rider is riding the human-powered vehicle 10. There are one or more of the adjusting devices 60. In another example, a single adjusting device 60 can be configured to adjust both the front suspension 46 and the rear suspension 48.

The adjusting device 60 can adjust an initial sag amount of the suspension 44 through various types of adjustment means or mechanisms. In a first example, the adjusting device 60 is configured to adjust the initial sag amount of the suspension 44 by changing an overall length of the suspension 44. The adjusting device 60 is configured to include a valve 61 and an actuator 62. The valve 61 is provided in flow passage RA extending between a chamber 44C and a chamber 44D that is fluidly connected with the chamber 44C. The actuator 62 opens and closes the valve 61. The actuator 62 includes an electric motor. In a second example, the adjusting device 60 is configured to adjust the initial sag amount of suspension 44 by changing a volume of the chamber 44C. The chamber 44C is configured to include a first chamber 44C1 and a second chamber 44C2 that is fluidly connected with the first chamber 44C1. The adjusting device 60 is configured to include a valve 63 and an actuator 64. The valve 63 is provided in flow passage RB extending between the first chamber 44C1 and the second chamber 44C2. The actuator 64 opens and closes the valve 63. The actuator 64 includes an electric motor. In a third example, the adjustment mechanisms of the first example and the second example are both used. The present embodiment employs the adjustment mechanism of the third example.

In the present embodiment, the adjusting device 60 includes the front adjusting device 60A that adjusts the front initial sag amount of the front suspension 46. The front adjusting device 60A can also be considered a front suspension sag adjuster. The front adjusting device 60A is configured to include a valve 61A and an actuator 62A. The valve 61A is provided in flow passage RA1 extending between the front chamber 46C and a chamber 46D that is fluidly connected with the front chamber 46C. The actuator 62A opens and closes the valve 61A. The actuator 62A includes an electric motor. The front chamber 46C includes a first chamber 46C1 and a second chamber 46C2 that is fluidly connected with the first chamber 46C1. The adjusting device 60 is configured to include a valve 63A and an actuator 64A. The valve 63A is provided in flow passage RB1 extending between the first chamber 46C1 and the second chamber 46C2. The actuator 64A opens and closes the valve 63A. The actuator 64A includes an electric motor. In the first example, the valve 63A and the actuator 64A are omitted from the front adjusting device 60A. In the second example, the valve 61A and the actuator 62A are omitted from the front adjusting device 60A.

In the present embodiment, the adjusting device 60 includes the rear adjusting device 60B that adjusts the rear initial sag amount of the rear suspension 48. The rear adjusting device 60B can also be considered a rear suspension sag adjuster. The rear adjusting device 60B is configured to include a valve 61B and an actuator 62B. The valve 61B is provided in flow passage RA2 extending between the rear chamber 48C and a chamber 48D that is fluidly connected with the chamber 48C. The actuator 62B opens and closes the valve 61B. The actuator 62B includes an electric motor. The rear chamber 48C is configured to include a first chamber 48C1 and a second chamber 46C2 that is fluidly connected with the second chamber 48C2. The adjusting device 60 is configured to include a valve 63B and an actuator 64B. The valve 63B is provided in flow passage RB2 extending between the first chamber 48C1 and the second chamber 48C2. The actuator 64B opens and closes the valve 63B. The actuator 64B includes an electric motor. In the first example, the valve 63B and the actuator 64B are omitted from the rear adjusting device 60B. In the second example, the valve 61B and the actuator 62B are omitted from the rear adjusting device 60B.

The controller 52 is configured to output a front control signal that adjusts the front initial sag amount of the front suspension 46 of the human-powered vehicle 10 and a rear control signal that adjusts the rear initial sag amount of the rear suspension 48 of the human-powered vehicle 10 to the adjusting device 60 based on traveling information related to traveling of the human-powered vehicle 10. The front initial sag amount refers to the distance over which a second member 46B of the front suspension 46 moves relative to a first member 46A of the front suspension 46 in a case where a rider is riding the human-powered vehicle 10. The rear initial sag amount refers to the distance over which a second member 48B of the rear suspension 48 moves relative to a first member 48A of the rear suspension 48 in a case where a rider is riding the human-powered vehicle 10.

The front control signal includes a front overall length control signal and a second front overall length control signal. The front overall length control signal sets an overall length of the front suspension 46 to a first front length, and the second front overall length control signal sets the overall length of the front suspension 46 to a second front length that is greater than the first front length. The overall length of the front suspension 46 is represented by maximum movable range L1 of the second member 46B of the front suspension 46 relative to the first member 46A. The front adjusting device 60A opens or closes the valve 61A by driving the actuator 62A to set the overall length of the front suspension 46 to the first front length or the second front length in accordance with the first front overall length control signal or the second front overall length control signal. The front initial sag amount in a case where the overall length of the front suspension 46 is the first length is smaller than the front initial sag amount in a case where the overall length of the front suspension 46 is the second length. The front control signal includes a first front volume control signal and a second front volume control signal. The first front volume control signal sets a volume of the front chamber 46C to a first front volume, and the second front volume control signal sets the volume of the front chamber 46C to a second front volume that is greater than the first front volume. The front adjusting device 60A opens or closes the valve 63A by driving the actuator 64A to set the volume of the front chamber 46C to the first front volume or the second front volume in accordance with the first front volume control signal or the second front volume control signal. Specifically, the front adjusting device 60A drives the actuator 64A to close the valve 63A and sets the volume of the front chamber 46C to the first front volume in accordance with the first front volume control signal. The adjusting device 60 drives the actuator 64A to open the valve 63A and sets the volume of the front chamber 46C to the second front volume in accordance with the second front volume control signal. The front initial sag amount in a case where the volume of the front chamber 46C is the first front volume is smaller than the front initial sag amount in a case where the volume of the front chamber 46C is the second front volume.

The rear control signal includes a first rear overall length control signal and a second rear overall length control signal. The first rear overall length control signal sets an overall length of the rear suspension 48 to a first rear length, and the second rear overall length control signal sets the overall length of the rear suspension 48 to a second rear length that is greater than the first rear length. The overall length of the rear suspension 48 is represented by maximum movable range L2 of a second member 48B of the rear suspension 48 relative to the first member 48A. The rear adjusting device 60B drives the actuator 62B to open or close the valve 61B and sets the overall length of the rear suspension 48 to the first rear length or the second rear length in accordance with the first rear overall length control signal or the second rear overall length control signal. The rear initial sag amount in a case where the overall length of the rear suspension 48 is the first length is smaller than the rear initial sag amount in a case where the overall length of the rear suspension 48 is the second length. The rear control signal includes a first rear volume control signal and a second rear volume control signal. The first rear volume control signal sets a volume of the rear chamber 48C to a first rear volume, and the second rear volume control signal sets the volume of the rear chamber 48C to a second rear volume that is greater than the first rear volume. The rear adjusting device 60B drives the actuator 64B to open or close the valve 63B and sets the volume of the rear chamber 48C to the first rear volume or the second rear volume in accordance with the first rear volume control signal or the second rear volume control signal. Specifically, the rear adjusting device 60B drives the actuator 64B to close the valve 63B and sets the volume of the rear chamber 48C to the first rear volume in accordance with the first rear volume control signal. The rear adjusting device 60B drives the actuator 64B to open the valve 63B and sets the volume of the rear chamber 48C to the second rear volume in accordance with the second rear volume control signal. The rear initial sag amount in a case where the volume of the rear chamber 48C is the first rear volume is smaller than the rear initial sag amount in a case where the volume of the rear chamber 48C is the second rear volume.

A detection device 70 detects the traveling information related to traveling of the human-powered vehicle 10. The traveling information includes an angle of the human-powered vehicle 10 with respect to a pitch direction and at least one of load on a front wheel support axle, load on a rear wheel support axle, input depression force, traveling speed, and a seated state of a rider. The detection device 70 includes a sensor mounted on the human-powered vehicle 10. The sensor includes at least one of an axial load sensor 70A, a vehicle speed sensor 70B, an acceleration sensor 70C, a torque sensor 70D, a cadence sensor 70E, a seated sensor 70F, and an inclination sensor 70G. Thus, term "detection device" as used herein refers to a hardware device or instrument designed to detect the presence or absence of a particular event, object, substance, or a change in its environment, and to emit a signal in response. The term "detection device" as used herein do not include a human.

The axial load sensor 70A detects load on a front wheel support axle X1 and load on a rear wheel support axle X2. The axial load sensor 70A detects load on a portion between the frame 16 and the front wheel support axle X1. In another example, the axial load sensor 70A detects load on a portion between the frame 16 and the rear wheel support axle X2. In the present embodiment, the axial load sensor 70A detects both of load on the portion between the frame 16 and the front wheel support axle X1 and load on the portion between the frame 16 and the rear wheel support axle X2.

The vehicle speed sensor 70B detects the traveling speed. The vehicle speed sensor 70B is configured to detect information corresponding to a rotational speed of the front wheel 12A or the rear wheel 12B of the human-powered vehicle 10. Preferably, the vehicle speed sensor 70B is configured to detect a magnet provided on the front wheel 12A or the rear wheel 12B of the human-powered vehicle 10. Preferably, the vehicle speed sensor 70B is configured to output a predetermined number of detection signals whenever the front wheel 12A or the rear wheel 12B rotates once. Preferably, the predetermined number is one. The vehicle speed sensor 70B outputs a signal corresponding to the rotational speed of the front wheel 12A or the rear wheel 12B. The controller 52 is configured to calculate the traveling speed of the human-powered vehicle 10 based on the rotational speed of the front wheel 12A or the rear wheel 12B. Preferably, the vehicle speed sensor 70B includes a magnetic reed forming a reed switch or a Hall element. The vehicle speed sensor 70B can be mounted on a chainstay of the frame 16 of the human-powered vehicle 10 to detect a magnet mounted on the rear wheel 12B. Alternatively, the vehicle speed sensor 70B can be provided on the front fork 28 to detect a magnet mounted on the front wheel 12A. In the present embodiment, the vehicle speed sensor 70B is configured so that a reed switch detects a magnet whenever the front wheel 12A or the rear wheel 12B rotates once.

The acceleration sensor 70C detects acceleration of the human-powered vehicle 10. Preferably, the acceleration sensor 70C is configured to detect acceleration of one or more axes. Preferably, the acceleration sensor 70C is configured to detect acceleration in a traveling direction of the human-powered vehicle 10.

The torque sensor 70D detects the depression force input to the human-powered vehicle 10. The torque sensor 70D is configured to output information corresponding to the depression force input to the crank assembly 14. The torque sensor 70D includes a torsion sensor, a magnetostrictive sensor, a pressure sensor, or the like. A torsion sensor includes a torsion gauge. The torque sensor 70D is, for example, provided on the crank axle 14A, a member that transmits the human driving force between the crank axle 14A and the first rotational body 22, the crank arm 14B, or the pedal 18.

The cadence sensor 70E is configured to detect information corresponding to the rotational speed of the crank axle 14A of the human-powered vehicle 10. The cadence sensor 70E is, for example, mounted on the frame 16 of the human-powered vehicle 10. The cadence sensor 70E includes a magnetic sensor that outputs a signal corresponding to the strength of the magnetic field. A ring-shaped magnet of which the magnetic field strength changes in a circumferential direction is provided on the crank axle 14A, a member that is rotated in cooperation with the crank axle 14A, or in the power transmission path extending from the crank axle 14A to the first rotational body 22. The cadence sensor 70E outputs a signal corresponding to the rotational speed of the crank axle 14A. The magnet can be provided on a member that rotates integrally with the crank axle 14A in the power transmission path of the human driving force between the crank axle 14A and the first rotational body 22. The cadence sensor 70E can include an optical sensor, an acceleration sensor, a torque sensor, or the like instead of the magnetic sensor.

The seated sensor 70F is, for example, provided on the adjustable seatpost 42 or the seat. The seated sensor 70F includes, for example, at least one of a load sensor, a pressure sensor, and a switch. The controller 52 is configured to determine whether a rider is in a seated state or a non-seated state from an output of the seated sensor 70F.

The inclination sensor 70G detects at least the angle of the human-powered vehicle 10 with respect to the pitch direction. The inclination sensor 70G includes, for example, at least one of a gyro sensor and an acceleration sensor. The inclination sensor 70G can be formed by a global positioning system (GPS) receiver. The controller 52 stores map information including information related to road gradient in the storage 54. The controller 52 obtains the road gradient of the present location of the human-powered vehicle 10 as the angle with respect to the pitch direction.

A determination performed by the controller 52 based on the traveling information related to the traveling detected by the detection device 70 will now be described. The controller 52 is configured to determine whether the human-powered vehicle 10 is traveling uphill or downhill based on at least one of first to seventh ways described below. In a case where the controller 52 determines whether the human-powered vehicle 10 is traveling uphill or downhill based on the result detected by multiple ways, in a first example, the controller 52 determines that the human-powered vehicle 10 is traveling uphill or downhill if it has been determined that the human-powered vehicle 10 is traveling uphill or downhill in all of the ways. In a second example, the controller 52 determines that the human-powered vehicle 10 is traveling uphill or downhill if it has been determined that the human-powered vehicle 10 is traveling uphill or downhill in more than half of the ways.

In the first way, for example, the controller 52 determines whether the human-powered vehicle 10 is traveling uphill or downhill from the detection result of the axial load sensor 70A at a first time and a second time that is a predetermined time elapsed from the first time. In a case where the load on the front wheel support axle X1 is decreased by a predetermined value or greater, the controller 52 determines that the human-powered vehicle 10 is traveling uphill. In a case where the load on the front wheel support axle X1 is increased by the predetermined value or greater, the controller 52 determines that the human-powered vehicle 10 is traveling downhill. In a case where the load on the rear wheel support axle X2 is increased by the predetermined value or greater, the controller 52 determines that the human-powered vehicle 10 is traveling uphill. In a case where the load on the rear wheel support axle X2 is decreased by the predetermined value or greater, the controller 52 determines that the human-powered vehicle 10 is traveling downhill. In a case where the load is not changed by the predetermined value or greater, the controller 52 determines that the human-powered vehicle 10 is traveling on level ground. Any value can be selected for the predetermined time and the predetermined value.

In the second way, for example, the controller 52 determines whether the human-powered vehicle 10 is traveling uphill or downhill from the detection result of the vehicle speed sensor 70B at the first time and the second time that is the predetermined time elapsed from the first time. In a case where the traveling speed is decreased by a predetermined value or greater, the controller 52 determines that the human-powered vehicle 10 is traveling uphill. In a case where the traveling speed is increased by the predetermined value or greater, the controller 52 determines that the human-powered vehicle 10 is traveling downhill. In a case where the traveling speed is not changed by the predetermined value or grater, the controller 52 determines that the human-powered vehicle 10 is traveling on level ground.

In the third way, for example, the controller 52 determines whether the human-powered vehicle 10 is traveling uphill or downhill from the detection result of the acceleration sensor 70C at the first time and the second time that is the predetermined time elapsed from the first time. In a case where the acceleration is decreased by a predetermined value or greater, the controller 52 determines that the human-powered vehicle 10 is traveling uphill. In a case where the acceleration is increased by the predetermined value or greater, the controller 52 determines that the human-powered vehicle 10 is traveling downhill. In a case where the change in acceleration is less than the predetermined value, the controller 52 determines that the human-powered vehicle 10 is traveling on level ground.

In the fourth way, for example, the controller 52 determines whether the human-powered vehicle 10 is traveling uphill or downhill from the detection result of the torque sensor 70D at the first time. In a case where the difference of the depression force input to the two pedals 18 is greater than or equal to zero and less than or equal to a predetermined value, the controller 52 determines that the human-powered vehicle 10 is traveling uphill. In a case where the difference of the depression force input to the two pedals 18 is greater than the predetermined value, the controller 52 determines that the human-powered vehicle 10 is traveling downhill. In a case where the difference of the depression force input to the two pedals 18 is zero, the controller 52 determines that the human-powered vehicle 10 is traveling on level ground.

In the fifth way, for example, the controller 52 determines whether the human-powered vehicle 10 is traveling uphill or downhill from the detection result of the cadence sensor 70E at the first time and the second time that is the predetermined time elapsed from the first time. In a case where a decrease in cadence is a predetermined value or grater, the controller 52 determines that the human-powered vehicle 10 is traveling uphill. In a case where an increase in cadence is the predetermined value or grater, the controller 52 determines that the human-powered vehicle 10 is traveling downhill. In a case where the change in cadence is less than the predetermined value, the controller 52 determines that the human-powered vehicle 10 is traveling on level ground.

In the sixth way, for example, the controller 52 determines the seated state of a rider from the detection result of the seated sensor 70F and determines whether the human-powered vehicle 10 is traveling uphill or downhill. In one example, in a case where the rider is seated, the controller 52 determines that the human-powered vehicle 10 is traveling uphill, and in a case where the rider is not seated, the controller 52 determines that the human-powered vehicle 10 is traveling downhill. In another example, in a case where the rider is not seated, the controller 52 determines that the human-powered vehicle 10 is traveling uphill. The determination based on the detection result of the seated sensor 70F can be performed by the controller 52 using a table stored in the storage 54 in advance. Alternatively, the determination based on the detection result of the seated sensor 70F can be set by the user. In the seventh way, for example, the controller 52 determines whether the human-powered vehicle 10 is traveling uphill or downhill from the detection result of the inclination sensor 70G.

In a case where the controller 52 determines that the human-powered vehicle 10 is traveling uphill based on the traveling information, the controller 52 executes the following control. In a first example, the controller 52 outputs both of the first front overall length control signal and the second rear overall length control signal to the adjusting device 60. Specifically, the controller 52 outputs both of the first front overall length control signal and the second rear overall length control signal to the front adjusting device 60A and the rear adjusting device 60B. In a second example, the controller 52 outputs both of the first front volume control signal and the second rear volume control signal to the adjusting device 60. Specifically, the controller 52 outputs both of the first front volume control signal and the second rear volume control signal to the front adjusting device 60A and the rear adjusting device 60B.

In a case where the controller 52 determines that the human-powered vehicle 10 is traveling downhill based on the traveling information, the controller 52 executes the following control. In a first example, the controller 52 outputs the second front overall length control signal to the front adjusting device 60A. In a second example, the controller 52 outputs the second front volume control signal to the front adjusting device 60A.

Figure 6:
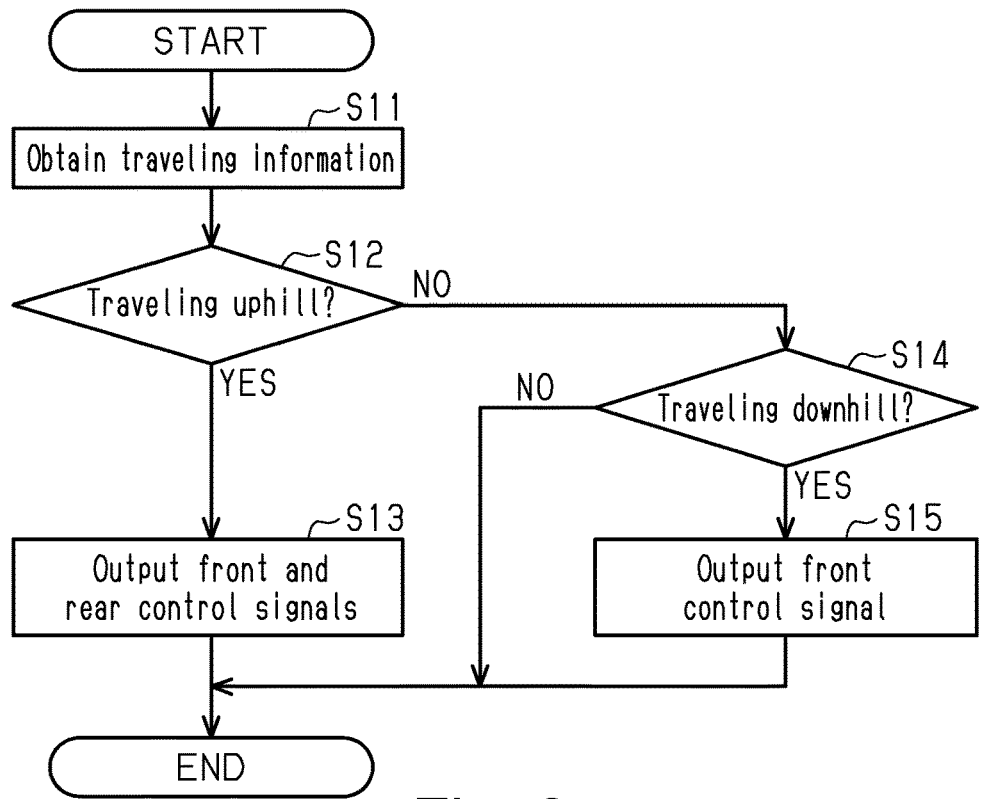
FIG. 6 is a flowchart illustrating one example of a control executed by an electronic controller in accordance with a first embodiment.

One example of the control executed by the controller 52 will now be described with reference to FIG. 6.

In step S11, the controller 52 obtains the traveling information from the detection device 70. In step S12, the controller 52 determines whether the human-powered vehicle 10 is traveling uphill based on the traveling information. In a case where the controller 52 determines that the human-powered vehicle 10 is traveling uphill (YES in step S12), the controller 52 outputs the front control signal to the front adjusting device 60A and outputs the rear control signal to the rear adjusting device 60B in step S13. In a first example, the front control signal includes the first front overall length control signal, and the rear control signal includes the second rear overall length control signal. In a second example, the front control signal includes the first front volume control signal, and the rear control signal includes the second rear volume control signal. After step S13, the controller 52 ends the process.

In a case where the controller 52 determines that the human-powered vehicle 10 is not traveling uphill (NO in step S12), the controller 52 determines whether the human-powered vehicle 10 is traveling downhill in step S14. In a case where the controller 52 determines that the human-powered vehicle 10 is not traveling downhill (NO in S14), the controller 52 ends the process. In a case where the controller 52 determines that the human-powered vehicle 10 is traveling downhill (YES in step S14), the controller 52 outputs the front control signal to the front adjusting device 60A in step S15. In a first example, the front control signal includes the second front overall length control signal. In a second example, the front control signal includes the second front volume control signal. After step S15, the controller 52 ends the process.

Second Embodiment

Figure 7:
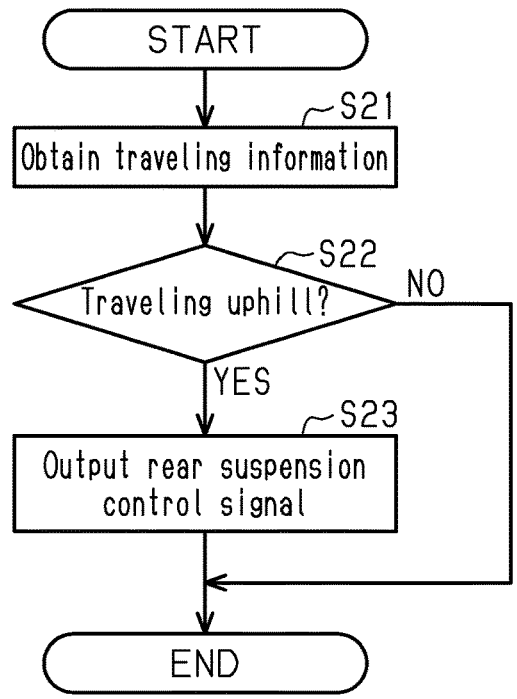
FIG. 7 is a flowchart illustrating one example of a control executed by an electronic controller in accordance with a second embodiment.

The control device 50 in accordance with a second embodiment will now be described with reference to FIG. 7. In the second embodiment, the human-powered vehicle 10 does not include the front adjusting device 60A. Otherwise, the human-powered vehicle 10 is configured in the same manner as the first embodiment. Thus, same reference numerals are given to those components that are the same as the corresponding components of the first embodiment. Such components will not be described in detail.

In the present embodiment, the control device 50 controls the rear adjusting device 60B that adjusts the rear initial sag amount of the rear suspension 48 of the human-powered vehicle 10 in a state where a rider is riding the human-powered vehicle 10. The control device 50 includes the controller 52 configured to output the rear control signal that adjusts the rear initial sag amount of the rear suspension 48 of the human-powered vehicle 10 based on the traveling information related to traveling of the human-powered vehicle 10. The rear suspension 48 includes the rear chamber 48C containing fluid to receive load produced by the rider.

The rear control signal includes the first rear overall length control signal and the second rear overall length control signal. The first rear overall length control signal sets the overall length of the rear suspension 48 to the first rear length, and the second rear overall length control signal sets the overall length of the rear suspension 48 to the second rear length that is greater than the first rear length. The rear control signal includes the first rear volume control signal and the second rear volume control signal. The first rear volume control signal sets the volume of the rear chamber 48C to a first volume, and the second rear volume control signal sets the volume of the rear chamber 48C to a second volume that is greater than the first volume.

In a case where the controller 52 determines that the human-powered vehicle 10 is traveling uphill based on the traveling information, the controller 52 executes the following control. In a first example, the controller 52 outputs the second rear overall length control signal to the adjusting device 60. In other words, the controller 52 outputs the second rear overall length control signal to the rear adjusting device 60B. In a second example, the controller 52 outputs the second rear volume control signal to the adjusting device 60. In other words, the controller 52 outputs the second rear volume control signal to the rear adjusting device 60B.

One example of the control executed by the controller 52 in accordance with the second embodiment will now be described with reference to FIG. 7.

In step S21, the controller 52 obtains the traveling information from the detection device 70. In step S22, the controller 52 determines whether the human-powered vehicle 10 is traveling uphill based on the traveling information. In a case where the controller 52 determines that the human-powered vehicle 10 is not traveling uphill (NO in S22), the controller 52 ends the process. In a case where the controller 52 determines that the human-powered vehicle 10 is traveling uphill (YES in step S22), the controller 52 outputs the rear control signal to the rear adjusting device 60B in step S23. After step S23, the controller 52 ends the process.

Third Embodiment

Figure 8:
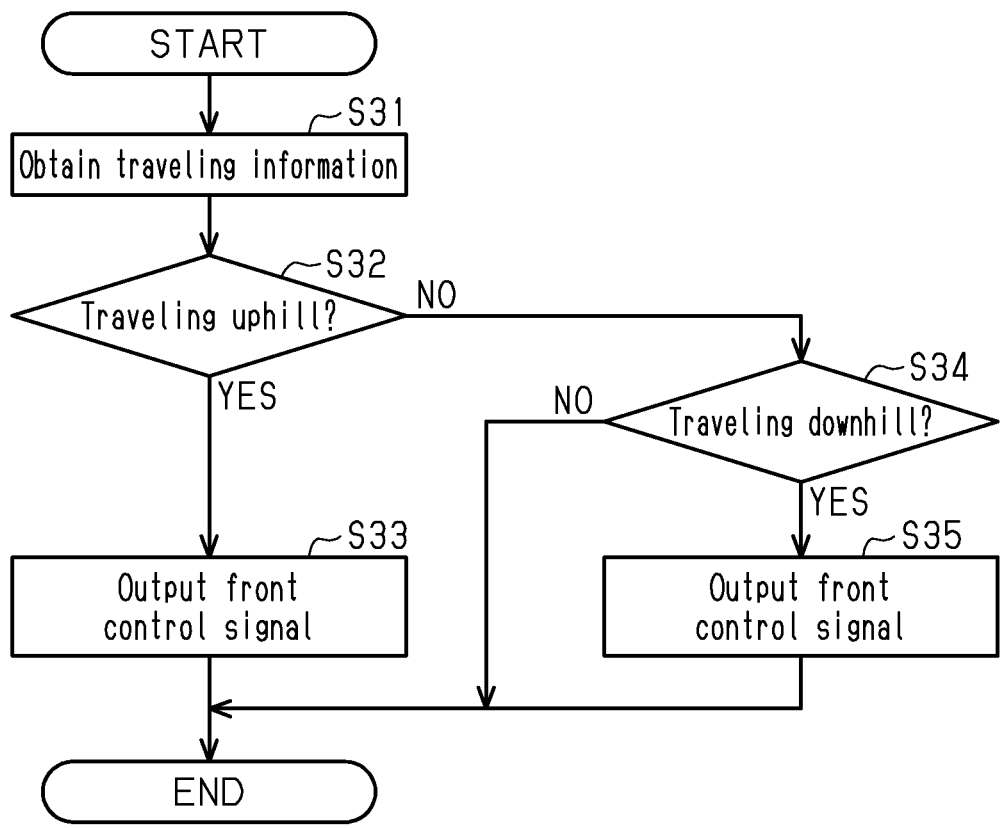
FIG. 8 is a flowchart illustrating one example of a control executed by an electronic controller in accordance with a third embodiment.

The control device 50 in accordance with a third embodiment will now be described with reference to FIG. 8. In the third embodiment, the human-powered vehicle 10 does not include the rear adjusting device 60B. Otherwise, the human-powered vehicle 10 is configured in the same manner as the first embodiment. Thus, same reference numerals are given to those components that are the same as the corresponding components of the first embodiment. Such components will not be described in detail.

The control device 50 controls the front adjusting device 60A that adjusts the front initial sag amount of the front suspension 46 of the human-powered vehicle 10 in a state where a rider is riding the human-powered vehicle 10. The control device 50 includes the controller 52 configured to output the front control signal that adjusts the height of the front suspension 46 of the human-powered vehicle 10 based on the traveling information related to traveling of the human-powered vehicle 10 excluding information related to the seated state of the rider and information related to a seat height. The traveling information includes the angle of the human-powered vehicle 10 with respect to a pitch direction and at least one of load on the front wheel support axle X1, load on the rear wheel support axle X2, input depression force, and traveling speed. The front suspension 46 includes the front chamber 46C containing fluid to receive load produced by the rider.

The front control signal includes the front overall length control signal and the second front overall length control signal. The front overall length control signal sets the overall length of the front suspension 46 to the first front length, and the second front overall length control signal sets the overall length of the front suspension 46 to the second front length that is greater than the first front length. The front control signal includes the first front volume control signal and the second front volume control signal. The first front volume control signal sets the volume of the front chamber 46C to a first volume, and the second front volume control signal sets the volume of the front chamber 46C to a second volume that is greater than the first volume.

In a case where the controller 52 determines that the human-powered vehicle 10 is traveling uphill based on the traveling information, the controller 52 executes the following control. In a first example, the controller 52 outputs the first front overall length control signal to the adjusting device 60. Specifically, the controller 52 outputs the first front overall length control signal to the front adjusting device 60A. In a second example, the controller 52 outputs the first front volume control signal to the adjusting device 60. Specifically, the controller 52 outputs the first front volume control signal to the front adjusting device 60A.

In a case where the controller 52 determines that the human-powered vehicle 10 is traveling downhill based on the traveling information, the controller 52 executes the following control. In a first example, the controller 52 outputs the second front overall length control signal to the adjusting device 60. Specifically, the controller 52 outputs the second front overall length control signal to the front adjusting device 60A. In a second example, the controller 52 outputs the second front volume control signal to the adjusting device 60. Specifically, the controller 52 outputs the second front volume control signal to the front adjusting device 60A.

One example of the control executed by the controller 52 in accordance with the third embodiment will now be described with reference to FIG. 8.

In step S31, the controller 52 obtains the traveling information from the detection device 70. In step S32, the controller 52 determines whether the human-powered vehicle 10 is traveling uphill based on the traveling information. In a case where the controller 52 determines that the human-powered vehicle 10 is traveling uphill (YES in step S32), the controller 52 outputs the front control signal to the front adjusting device 60A in step S33. In a first example, the front control signal includes the first front overall length control signal. In a second example, the front control signal includes the first front volume control signal. After step S33, the controller 52 ends the process.

In a case where the controller 52 determines that the human-powered vehicle 10 is not traveling uphill (NO in step S32), the controller 52 determines whether the human-powered vehicle 10 is traveling downhill in step S34. In a case where the controller 52 determines that the human-powered vehicle 10 is not traveling downhill (NO in S34), the controller 52 ends the process. In a case where the controller 52 determines that the human-powered vehicle 10 is traveling downhill (YES in step S34), the controller 52 outputs the front control signal to the front adjusting device 60A in step S35. In a first example, the front control signal includes the second front overall length control signal. In a second example, the front control signal includes the second front volume control signal. After step S35, the controller 52 ends the process.

Modifications

The description related with the above embodiments exemplifies, without any intention to limit, an applicable form of a control device according to the present disclosure. In addition to the embodiments described above, the control device according to the present disclosure is applicable to, for example, modifications of the above embodiments that are described below and combinations of at least two of the modifications that do not contradict each other. In the modifications described hereafter, same reference numerals are given to those components that are the same as the corresponding components of the above embodiments. Such components will not be described in detail.

The control device 50 can be configured to control a component 36 other than the suspension 44. In one example, the controller 52 can be configured to control at least one of the transmission 38, the drive unit 40, and the adjustable seatpost 42.

In the first embodiment, the controller 52 can be configured to control the suspension 44 in accordance with a control mode. The control mode is, for example, stored in the storage 54. The control mode includes a first control mode, a second control mode, and a third control mode. In the first control mode, the controller 52 controls both of the front adjusting device 60A and the rear adjusting device 60B. In the second control mode, the controller 52 controls only the rear adjusting device 60B. In the third control mode, the controller 52 controls only the front adjusting device 60A.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

What is claimed is:

1. A control device for controlling an adjusting device that adjusts a front initial sag amount of a front suspension of a human-powered vehicle in a state where a rider is riding the human-powered vehicle, and that adjusts a rear initial sag amount of a rear suspension of the human-powered vehicle in a state where the rider is riding the human-powered vehicle, the control device comprising:

an electronic controller configured to output a front control signal that adjusts the front initial sag amount of the front suspension of the human-powered vehicle, and output a rear control signal that adjusts the rear initial sag amount of the rear suspension of the human-powered vehicle to the adjusting device based on traveling information of the human-powered vehicle related to a result detected by an axial load sensor that detects load on a front wheel support axle of the human-powered vehicle and load on a rear wheel support axle of the buman-powered vehicle.

2. The control device according to claim 1, wherein
the front control signal includes a first front overall length control signal that sets an overall length of the front suspension to a first front length and a second front overall length control signal that sets the overall length of the front suspension to a second front length that is greater than the first front length, and
the rear control signal includes a first rear overall length control signal that sets an overall length of the rear suspension to a first rear length and a second rear overall length control signal that sets the overall length of the rear suspension to a second rear length that is greater than the first rear length.

3. The control device according to claim 2, wherein
the electronic controller is configured to output both of the first front overall length control signal and the second rear overall length control signal to the adjusting device upon the electronic controller determining that the human-powered vehicle is traveling uphill based on the traveling information.

4. The control device according to claim 2, wherein
the electronic controller is configured to output the second front overall length control signal to the adjusting device upon the electronic controller determining that the human-powered vehicle is traveling downhill based on the traveling information.

5. The control device according to claim 1, wherein
the front suspension includes a front chamber containing fluid to receive load produced by the rider, the rear suspension includes a rear chamber containing fluid to receive load produced by the rider,
the front control signal includes a first front volume control signal that sets a volume of the front chamber to a first front volume and a second front volume control signal that sets the volume of the front chamber to a second front volume that is greater than the first front volume, and
the rear control signal includes a first rear volume control signal that sets a volume of the rear chamber to a first rear volume and a second rear volume control signal that sets the volume of the rear chamber to a second rear volume that is greater than the first rear volume.

6. The control device according to claim 5, wherein
the electronic controller is configured to output both of the first front volume control signal and the second rear volume control signal to the adjusting device upon the electronic controller determining that the human-powered vehicle is traveling uphill based on the traveling information.

7. The control device according to claim 5, wherein
the electronic controller is configured to output the second front volume control signal upon the electronic controller determining that the human-powered vehicle is traveling downhill.

8. The control device according to claim 1, wherein
the rear suspension includes a rear chamber containing fluid to receive load produced by the rider, and
the rear control signal includes a first rear volume control signal that sets a volume of the rear chamber to a first volume and a second rear volume control signal that sets the volume of the rear chamber to a second volume that is greater than the first volume.

9. The control device according to claim 8, wherein
the electronic controller is configured to output the second rear volume control signal to the adjusting device upon the electronic controller determining that the human-powered vehicle is traveling uphill based on the traveling information.

10. The control device according to claim 1, wherein
the traveling information includes an angle of the human-powered vehicle with respect to a pitch direction and at least one of a load on a front wheel support axle, a load on a rear wheel support axle, an input depression force, a traveling speed, and a seated state of the rider.

11. A control device for controlling an adjusting device that adjusts a rear initial sag amount of a rear suspension of a human-powered vehicle in a state where a rider is riding the human-powered vehicle, the control device comprising:

an electronic controller configured to output a rear control signal that adjusts the rear initial sag amount of the rear suspension of the human-powered vehicle based on traveling information of the human-powered vehicle related to a result detected by an axial load sensor that detects load on a front wheel support axle of the human-powered vehicle and load on a rear wheel support axle of the human-powered vehicle.

12. The control device according to claim 11, wherein
the rear control signal includes a first rear overall length control signal that sets an overall length of the rear suspension to a first rear length and a second rear overall length control signal that sets the overall length of the rear suspension to a second rear length that is greater than the first rear length.

13. The control device according to claim 12, wherein
the electronic controller is configured to output the second rear overall length control signal to the adjusting device upon the electronic controller determining that the human- powered vehicle is traveling uphill based on the traveling information.

14. A control device for controlling an adjusting device that adjusts a front initial sag amount of a front suspension of a human-powered vehicle in a state where a rider is riding the human-powered vehicle, the control device comprising:

an electronic controller configured to output a front control signal that adjusts a height of the front suspension of the human-powered vehicle based on traveling information related to traveling of the human-powered vehicle excluding information related to a seated state of the rider and information related to a seat height related to a result detected by an axial load sensor that detects load on a front wheel support axle of the human-powered vehicle and load on a rear wheel support axle of the human-powered vehicle.

15. The control device according to claim 14, wherein the front control signal includes a first front overall length control signal that sets an overall length of the front suspension to a first front length and a second front overall length control signal that sets the overall length of the front suspension to a second front length that is greater than the first front length.

16. The control device according to claim 15, wherein the electronic controller is configured to output the first front overall length control signal to the adjusting device upon the electronic controller determining that the human-powered vehicle is traveling uphill based on the traveling information.

17. The control device according to claim 15, wherein the electronic controller is configured to output the second front overall length control signal to the adjusting device upon the electronic controller determining that the human- powered vehicle is traveling downhill based on the traveling information.

18. The control device according to claim 14, wherein the front suspension includes a front chamber containing fluid to receive load produced by the rider, and the front control signal includes a first front volume control signal that sets a volume of the front chamber to a first volume and a second front volume control signal that sets the volume of the front chamber to a second volume that is greater than the first volume.

19. The control device according to claim 18, wherein the electronic controller is configured to output the first front volume control signal to the adjusting device upon the electronic controller determining that the human-powered vehicle is traveling uphill based on the traveling information.

20. The control device according to claim 18, wherein the electronic controller is configured to output the second front volume control signal to the adjusting device upon the electronic controller determining that the human-powered vehicle is traveling downhill based on the traveling information.

21. The control device according to claim 14, wherein the traveling information includes an angle of the human-powered vehicle with respect to a pitch direction and at least one of a load on a front wheel support axle, a load on a rear wheel support axle, an input depression force, and a traveling speed.

* * * * *